(12) United States Patent
Mezzino et al.

(10) Patent No.: US 12,179,909 B2
(45) Date of Patent: Dec. 31, 2024

(54) STABILITY CONTROL AUGMENTATION SYSTEM AND METHOD

(71) Applicant: Microtecnica S.r.l., Turin (IT)

(72) Inventors: Giacomo Mezzino, Turin (IT); Domenico Tafuni, Turin (IT)

(73) Assignee: MICROTECNICA S.R.L., Turin (IT)

(*) Notice: Subject to any disclaimer, the term of this patent is extended or adjusted under 35 U.S.C. 154(b) by 141 days.

(21) Appl. No.: 17/950,409

(22) Filed: Sep. 22, 2022

(65) Prior Publication Data
US 2023/0101289 A1 Mar. 30, 2023

(30) Foreign Application Priority Data
Sep. 27, 2021 (EP) .................................. 21199251

(51) Int. Cl.
| | | |
|---|---|---|
| *B64C 13/40* | (2006.01) | |
| *F15B 13/04* | (2006.01) | |
| *F16K 11/07* | (2006.01) | |
| *F16K 27/04* | (2006.01) | |
| *F16K 31/00* | (2006.01) | |
| *F16K 31/528* | (2006.01) | |

(52) U.S. Cl.
CPC .......... *B64C 13/40* (2013.01); *F15B 13/0403* (2013.01); *F16K 11/07* (2013.01); *F16K 27/041* (2013.01); *F16K 31/004* (2013.01); *F16K 31/5286* (2013.01)

(58) Field of Classification Search
CPC ...... B64C 13/40; F15B 13/0403; F16K 11/07; F16K 31/004; F16K 31/007; F16K 31/008; F16K 41/5286

USPC .................................. 91/378; 244/78.1, 78.2
See application file for complete search history.

(56) References Cited

U.S. PATENT DOCUMENTS

| | | | |
|---|---|---|---|
| 2,888,943 A * | 6/1959 | Hipple | ................ F15B 13/0403 91/468 |
| 3,482,486 A | 12/1969 | Nordholm, Jr. | |
| 5,082,208 A | 1/1992 | Matich | |
| 6,526,864 B2 | 3/2003 | Lindler et al. | |
| 7,338,017 B2 | 3/2008 | Pitt | |
| 10,344,885 B2 * | 7/2019 | Brooks | ................ F15B 13/043 |
| 10,598,297 B2 | 3/2020 | Wiktorko | |

(Continued)

FOREIGN PATENT DOCUMENTS

| | | | | |
|---|---|---|---|---|
| DE | 2855636 A1 | 6/1980 | | |
| DE | 102013218032 A1 * | 3/2015 | .............. | F01L 1/344 |

(Continued)

OTHER PUBLICATIONS

DE102013218032A1_t machine translation thereof (Year: 2015).*

(Continued)

*Primary Examiner* — Kenneth Bomberg
*Assistant Examiner* — Matthew Wiblin
(74) *Attorney, Agent, or Firm* — CANTOR COLBURN LLP (57) ABSTRACT

A stability control augmentation system and method for a flight control surface of an aircraft. The system includes s an actuator operable for actuating the flight control surface, and a control valve comprising a spool and an integrated augmentation mechanism. The spool and the actuation mechanism are both moveable to open and close a fluid flow path through the control valve to control the actuator.

12 Claims, 8 Drawing Sheets

(56) References Cited

U.S. PATENT DOCUMENTS

| | | | |
|---|---|---|---|
| 10,651,364 B2 | 5/2020 | Bertrand et al. | |
| 10,954,971 B2 | 3/2021 | Jaskiewicz et al. | |
| 2005/0121637 A1* | 6/2005 | Adams | F01L 9/10 |
| | | | 251/129.15 |
| 2007/0075286 A1* | 4/2007 | Tanner | F16K 11/07 |
| | | | 251/129.06 |
| 2018/0100593 A1* | 4/2018 | Smolka | F16K 31/0613 |

FOREIGN PATENT DOCUMENTS

| | | | | |
|---|---|---|---|---|
| EP | 3467608 A1 | 4/2019 | | |
| EP | 3868654 A1 | 8/2021 | | |
| FR | 3054619 A1 * | 2/2018 | | B64C 13/36 |
| GB | 2026406 A | 2/1980 | | |
| GB | 2038511 A | 7/1980 | | |

OTHER PUBLICATIONS

FR2494249A1_t machine translation thereof (Year: 2018).*
European Search Report for Application No. 21199251.6, mailed Mar. 4, 2022, 8 pages.

* cited by examiner

STABILITY CONTROL AUGMENTATION SYSTEM AND METHOD

CROSS-REFERENCE TO RELATED APPLICATIONS

This application claims priority to European Patent Application No. 21199251.6 filed Sep. 27, 2021, the entire contents of which is incorporated herein by reference.

FIELD

Embodiments are directed to a stability control augmentation system for a flight control surface of an aircraft, and a method of providing stability control augmentation to a flight control surface of an aircraft.

BACKGROUND

A Stability Control Augmentation System (SCAS) is typically provided to help slightly modify a pilot command to an actuator controlling a flight control surface of an aircraft, in order to counteract small and/or high-frequency vibrations and fluctuations of the flight control surface. The SCAS can therefore provide limited control of the actuator (and therefore of the flight control surface) on top of the pilot commands e.g. to improve stability of the aircraft.

Stability Control Augmentation Systems are typically included within the mechanical linkage driving the hydraulic actuators. However, this architecture is relatively massive and complex. Improvements in SCAS's are therefore desirable.

SUMMARY

According to a first aspect of the invention there is provided a stability control augmentation system for a flight control surface of an aircraft, comprising: an actuator operable for actuating the flight control surface; and a control valve comprising a spool and an integrated augmentation mechanism, wherein the spool is moveable to increase or decrease a cross-section of a fluid flow path through the control valve to thereby increase or decrease a flow of hydraulic fluid to the actuator during use, and wherein the integrated augmentation mechanism is operable to increase or decrease the cross-section of the fluid flow path to thereby adjust the flow of hydraulic fluid to the actuator during use.

The augmentation mechanism therefore provides stability control augmentation as part of the control valve. The augmentation mechanism is integrated into the control valve, and the spool may be operable to control fluid flow through the control valve with the integrated augmentation mechanism being operable to modify any such fluid flow through the control valve. The spool may therefore open and close the fluid flow path through the control valve and the actuation mechanism may be moveable to modify how much the spool has opened or closed the fluid flow path. The augmentation mechanism may be operable to increase or decrease the cross-section of the flow path by a fraction of the amount by which the spool is operable to increase or decrease the cross-section of the fluid flow path. The spool may therefore be operable to provide most of the control over the actuator, and may be moveable e.g. by a pilot or other user. The augmentation mechanism may then be operable in addition to the spool to fractionally increase or decrease the cross-section of the flow path through the control valve. The augmentation mechanism may therefore fine-tune the output of the control valve to provide fine control over the actuator and thereby suppress vibrations of the flight control surface. The spool may be operable to increase or decrease the rate of fluid flow through the control valve to a greater extent than is the augmentation mechanism. The augmentation mechanism may be operable to fractionally adjust (e.g. by up to 12%, by up to 10%, by up to 8%, or by up to 6%) the rate of flow through the control valve as determined by the spool e.g. by fractionally opening or closing the flow path through the control valve.

The spool may therefore be the main control for the actuator, while the augmentation mechanism may provide a limited adjustment (e.g. up to 6%, 8%, 10%, or 12%) of the output of the control valve. The augmentation mechanism can thereby provide stability control augmentation to the actuator by adjusting (e.g. fractionally increasing or decreasing) the flow of hydraulic fluid through the control valve. The augmentation mechanism may therefore adjust the rate of fluid flow through the control valve by increasing or decreasing the cross-section of the flow path that has already been opened or closed by movement of the spool. The spool may be moveable to increase or decrease the cross-sections of a plurality of fluid flow paths through the control valve to thereby increase or decrease a rate of flow of hydraulic fluid to and/or from the actuator i.e. to open or restrict flow paths to and from the actuator. The integrated augmentation mechanism may be operable to increase or decrease the cross-sections of the plurality of flow paths to thereby adjust the rate of flow of hydraulic fluid to and/or from the actuator.

The actuator may comprise opposed fluid chambers either side of a piston, and the control valve may be operable to supply fluid to one of the opposed fluid chambers at the same time as receiving fluid from the other, and vice versa, in order to move the piston in response to a pressure differential across the piston, between the opposed fluid chambers, created by the fluid flow controlled by the control valve. The spool and/or augmentation mechanism may therefore simultaneously adjust the flow (or rate of flow) of hydraulic fluid to and from the actuator.

The spool may have a steady-state position in which the fluid flow path is closed (e.g. a middle position), wherein the spool is axially moveable from the steady-state position in a first direction to thereby actuate the actuator in a first actuator direction, and wherein the spool is axially moveable from the steady-state position in a second direction to actuate the actuator in a second actuator direction.

The steady-state position of the spool may therefore be the position in which no fluid flows through the control valve e.g. when augmentation mechanism is not being used (e.g. is not adjusting the flow as controlled by the spool). The second direction may be opposite to the first direction. The second actuator direction may be opposite the first actuator direction. Movement of the spool from the steady-state position in the first direction may provide fluid communication between predetermined fluid ports of the control valve. Movement of the spool from the steady-state position in the second direction may provide fluid communication between other predetermined fluid ports of the control valve. The spool may therefore be axially moveable to control which fluid ports of the control valve communicate with each other, and thereby control the supply of fluid to (and from) the actuator. The spool may therefore move in either direction from its steady-state position to thereby control fluid flow through the control valve. The steady-stage position may be a middle position.

For example, movement of the spool in the first direction may fluidly connect a supply port (e.g. of pressurised hydraulic fluid) to a first control port (and a second control port to a return port) to move the actuator in the first actuator direction. Movement of the spool in the second direction may fluidly connect the supply port to the second control port (and the first control port to a return port) to move the actuator in the second actuator direction. The spool may be moveable to permit or prevent fluid flow via fluid ports of the control valve (e.g. fluid ports of a fixed sleeve of the control valve). The spool may uncover the fluid port and thereby permit fluid communication between predetermined ones of the fluid ports. The spool may move to close fluid flow ports and thereby prevent fluid communication between predetermined ones of the fluid ports.

The augmentation mechanism may comprise an intermediate sleeve that is axially movable to increase or decrease the cross-section of the fluid flow path through the control valve. The intermediate sleeve may move in the same directions as the spool e.g. in the first direction and/or the second direction. The intermediate sleeve may be axially moveable relative to the spool. The spool may be within (e.g. fully within) the intermediate sleeve. The intermediate sleeve may surround the spool. The flow path(s) may include fluid ports in the intermediate sleeve. The intermediate sleeve may be interposed between the spool and the fluid flow ports of the control valve. The spool may therefore receive hydraulic fluid (e.g. from the fluid ports) via the intermediate sleeve. Thus, the spool may be moved e.g. to open/close the fluid flow path(s) through the control valve, and the intermediate sleeve may be moved (e.g. by a distance less than the spool is moved) to thereby adjust the rate of fluid flow through the fluid flow path(s) e.g. to make the cross-section(s) slightly smaller so that a fraction less hydraulic fluid flows through the control valve, or to make the cross-section(s) slightly larger so that a fraction more hydraulic fluid flows through the control valve. The spool may therefore be used for the majority of control, with the intermediate sleeve used for fine tuning the effect of the spool e.g. to counteract vibrations of the control surface.

The intermediate sleeve may comprise a plurality of sleeve ports, which sleeve ports may be registrable with the fluid ports of the control valve to thereby provide fluid to the spool and/or receive fluid from the spool. The spool may comprise a plurality of stops registrable with the sleeve ports to permit and/or prevent fluid flow through the sleeve ports. The spool may therefore control fluid flow through the control valve by its stops being moving into and out of registration with the sleeve ports, which sleeve ports in turn provide fluid communication to the fluid flow ports. Since the sleeve ports may be interposed between the stops of the spool and the fluid flow ports of the control valve, movement of the intermediate sleeve, and hence of the sleeve ports, may adjust fluid flow through the control valve as controlled by the spool.

The augmentation mechanism may comprise a piezoelectric element operable to increase or decrease the cross-section of the fluid flow path. The piezoelectric element may be operable to actuate the intermediate sleeve. The piezoelectric element may be operable to expand and/or contract. The piezoelectric element may be operable to move the intermediate sleeve in the first direction and/or the second direction. The intermediate sleeve may move relative to the spool (and e.g. relative to a fixed sleeve of the control valve or a housing thereof) to thereby increase and/or decrease a rate of fluid flow through the control valve. For example, movement of the intermediate sleeve relative to the spool may move at least one of the sleeve ports relative to at least one of the stops of the spool, to thereby change the rate of fluid flow through the control valve during use.

The piezoelectric element may be operable to move the intermediate sleeve by only a fraction of the distance that the spool is moveable. That is, the intermediate sleeve may be moveable by a smaller distance than the spool is moveable (e.g. up to 12%, 10%, 8% or 6%) and hence may have a smaller effect on the rate of fluid flow through the control valve than may the spool.

The piezoelectric element may have a steady-state configuration (e.g. a middle configuration) in which the intermediate sleeve is in a steady-state position e.g. in which no fluid flows through the control valve e.g. when the spool is in its steady-state position (or in which it does not adjust the fluid flow as controlled by the spool). The piezoelectric element may change from its steady-state configuration (e.g. by contraction) to thereby move the intermediate sleeve in the first direction. The piezoelectric element may change from its steady-state configuration (e.g. by extension) to thereby move the intermediate sleeve in the second direction. The configuration of the piezoelectric element may be controlled by changing a voltage applied thereto. The piezoelectric element may be put into its steady-state configuration by application of a predetermined voltage thereto. The piezoelectric element may then be contracted by reducing the voltage applied thereto, and/or may be extended by increasing the voltage applied thereto. The control valve may therefore comprise terminals for applying voltage to the piezoelectric element. The intermediate sleeve may comprise a flange (e.g. adjacent the piezoelectric element) arranged to co-operate with the piezoelectric element to thereby drive the intermediate sleeve in the first and/or second directions.

The control valve may comprise a rocking pin connecting the spool and the augmentation mechanism, wherein the rocking pin is rotatable about two different points. The rocking pin may be arranged to rotate to thereby enable relative movement between the spool and augmentation mechanism e.g. between the spool and the intermediate sleeve of the augmentation mechanism. The rocking pin may rotate to thereby actuate the spool (e.g. by action of a summation sleeve as described herein). The pin may be configured to accommodate relative movement of the intermediate sleeve and the spool. The rocking pin may be configured and arranged to rotate about two different points along its length e.g. in different configurations of the control valve. For example, the control valve may be arranged so that the pin rotates about a first pivot in order to drive the spool without movement of the intermediate sleeve, and about a second pivot at a different location to the first pivot to allow movement of the intermediate sleeve relative to the spool.

The control valve may be in arranged so that movement of the intermediate sleeve in the first direction drives movement of the spool in the second direction by rotation of the rocking pin e.g. about its second pivot. The control valve may be arranged so that movement of the intermediate sleeve in the second direction drives movement of the spool in the first direction by rotation of the rocking pin e.g. about its second pivot. Thus, the rocking pin may be arranged to cause the intermediate sleeve and spool to be driven in opposite directions by action of the piezoelectric element. The control valve may comprise a fulcrum against which the rocking pin rotates to provide opposite movement of the intermediate sleeve and spool (e.g. a summation sleeve as described below). That is, the rocking pin may serve as a lever whereby movement of the intermediate sleeve drives corresponding movement of the spool. The rocking pin may also rotate about its first pivot e.g. when the intermediate sleeve is stationary to thereby drive the spool. Rotation of the rocking pin about its first pivot therefore causes movement of the second pivot in an arc, and rotation of the rocking pin about its second pivot causes movement of the first pivot in an arc.

The stability control augmentation system may comprise an input linkage operable to move the spool of the control valve. For example, the input linkage may comprise one or more levers, and may be arranged for actuation by a pilot of the aircraft, a flight control computer, or any other suitable user of the system, for controlling the actuator. The input linkage may comprise a plurality of floating pivots (e.g. pivots moveable in space depending on the configuration of the input linkage and any inputs thereto). The input linkage may comprise a single fixed pivot e.g. only one pivot that does not move in space. A lever head as described herein may rotate about the single fixed pivot.

The control valve may be arranged so that the spool is moveable without movement of the augmentation mechanism e.g. without movement of the intermediate sleeve and/or without expansion or contraction of the piezoelectric element. Thus, in the event that the augmentation mechanism is disabled for any reason then the spool of the control valve (and hence the actuator) may be controllable by suitable control of the input linkage e.g. by a pilot joystick, pedals, or the like. Thus, failure of the augmentation mechanism does not prevent normal operation of the system and the augmentation mechanism may be fail safe.

The stability control augmentation system may comprise a feedback mechanism configured to adjust the input linkage based on the configuration of the actuator. The feedback mechanism may be arranged so that movement of the actuator (e.g. movement of the piston of the actuator) operates the feedback mechanism e.g. to return the spool to its steady-state position so that further fluid flow through the control valve is prevented (or substantially prevented subject to adjustments by the augmentation mechanism). Therefore, following actuation of the spool by the input linkage to a predetermined position, the control valve may adjust the actuator to a corresponding configuration, at which point the feedback mechanism may return the spool to its steady-state position and thereby prevent further movement of the actuator, unless the input linkage is moved again.

The feedback mechanism therefore provides a means of stopping movement of the piston of the actuator (and hence the flight control surface) once it reaches a certain position. It is therefore not necessary to e.g. return the input linkage to its original position to prevent further movement of the flight control surface. Thus, the feedback mechanism provides that each position of the input linkage moves the actuator to a corresponding position at which point it stops. Movement of the input linkage to a first configuration will actuate the actuator to a corresponding first configuration, at which point further movement will be stopped, until such time as the input linkage is moved again to further move the actuator. Further movement will actuate the actuator to a second configuration, at which point it will stop again, and so on. Put simply, the feedback mechanism ensures that each input configuration of the input linkage (e.g. each input position of a pilot's flight control stick or the like) corresponds to a position of the flight control surface.

The control valve may comprise a summation sleeve movable by a lever head of the input linkage to move the spool. The summation sleeve may therefore be driven by the input linkage, and may move the spool by rotation of the rocking pin e.g. about its first pivot. The rocking pin may pass through the summation sleeve, and a portion of the summation sleeve may be interposed between the intermediate sleeve and the spool. The summation sleeve may therefore move axially e.g. relative to the intermediate sleeve when the intermediate sleeve is stationary. The spool may move in the same direction as the summation sleeve, albeit by a greater amount.

Movement of the summation sleeve in a first direction may cause the spool to move in the first direction, and movement of the summation sleeve in a second direction causes the spool to move in the second direction, for example when the intermediate sleeve is stationary. Movement of the summation sleeve may actuate the spool by leverage of the rocking pin between the intermediate sleeve and the summation sleeve. The spool may therefore be moved without operation of the augmentation mechanism (e.g. without movement of the intermediate sleeve). The spool may therefore be moveable while the intermediate sleeve is stationary.

The summation sleeve may also serve as a fulcrum about which the rocking pin rotates (e.g. about its second pivot) when the intermediate sleeve is actuated by the piezoelectric element. Thus, provision of the rocking pin and the summation sleeve interposed between the intermediate sleeve and the spool allows the augmentation mechanism to drive the spool by operation of the piezoelectric element, while at the same time allowing the spool to be driven by movement of the summation sleeve and lever head. Thus, the piezoelectric element may be operable to move the spool relative to the intermediate sleeve and thereby increase or decrease a rate of fluid flow through the control valve e.g. by increasing a decreasing the cross section(s) of the fluid flow path(s) through the control valves.

The control valve may comprise a housing, and the spool and the augmentation mechanism may be contained within the housing. The piezoelectric element and/or the intermediate sleeve may be within the housing. The rotating pin may be within the housing e.g. fully within the housing. The summation sleeve may be at least partially within the hosing and may be fully within the housing. The control valve may therefore provide a single component for controlling the actuator and for providing integrated stability control augmentation.

The stability control augmentation system may comprise a controller configured to operate the augmentation mechanism. The controller may adjust the voltage applied to the piezoelectric element to thereby actuate the intermediate sleeve. The controller may be configured to adjust a voltage or suitable signal applied to the piezoelectric element to thereby provide stability control augmentation to the actuator e.g. in response to a signal from a sensor.

The system may comprise a second control valve, the second control valve being substantially the same as or identical to the control valve already described herein. The system may therefore comprise dual control valves, each independently operable to control the flight control surface. The system may hence provide redundancy for failure of either control valve.

According to a second aspect of the invention there is provided an aircraft comprising the stability control augmentation system as described herein with reference to the first aspect of the invention, arranged to actuate a flight control surface of the aircraft.

The system may comprise a sensor arranged to detect vibration and/or fluctuation of the fight control surface, and the controller may be configured to receive a signal from the sensor and operate the piezoelectric element in response to that signal to thereby counteract the effect of vibration and/or fluctuation of the flight control surface.

The aircraft may be any suitable aircraft, and the flight control surface may be any suitable flight control surface. The aircraft may be a helicopter and/or the flight control surface may be a rotor blade of the helicopter. The augmentation system may allow the helicopter to hover in place, with vibrations and fluctuations of the rotor blades counteracted by the augmentation system to improve stability of the helicopter's hovering.

According to a third aspect of the invention there is provided a method of providing stability control augmentation to a flight control surface of an aircraft, comprising: providing a control valve comprising a spool and an integrated augmentation mechanism; increasing or decreasing a cross-section of a fluid flow path through the control valve by moving the spool to thereby increase or decrease a flow of hydraulic fluid to an actuator operable to actuate the flight control surface; increasing or decreasing the cross-section of the fluid flow path using the augmentation mechanism to thereby adjust the flow of hydraulic fluid to the actuator.

The method may comprise providing a rocking pin connecting the spool and the augmentation mechanism, and rotating the rocking pin about a first pivot to actuate the spool of the control valve and thereby increase or decrease the cross-section of the fluid flow path. The method may comprise actuating the spool while the augmentation mechanism (e.g. an intermediate sleeve thereof) is stationary.

The method may comprise actuating the augmentation mechanism and thereby rotating the rocking pin about a second pivot to increase or decrease the cross-section of the fluid flow path. The method may comprise fractionally adjusting the flow of hydraulic fluid through the control valve using the augmentation mechanism. The method may comprise actuating the spool via the rocking pin using the augmentation mechanism.

The method may comprise actuating the spool in a first direction by moving an intermediate sleeve of the augmentation mechanism in a second direction using a piezoelectric element. The method may comprise actuating the spool in the second direction by moving an intermediate sleeve of the augmentation mechanism in the first direction using the piezoelectric element. The method may comprise actuating the spool in the first direction by driving an end of the rocking pin in the second directing using the intermediate sleeve. The method may comprise actuating the spool in the second direction by driving the end of the rocking pin in the first directing using the intermediate sleeve.

The method may comprise using and/or providing the system and/or any of the features of the invention as described herein with reference to the first aspect of the invention and/or the second aspect of the invention.

According to another aspect of the invention, there is provided a stability control augmentation system (e.g. for a flight control surface of an aircraft), comprising a control valve operable to control an actuator, the control valve comprising an integrated augmentation mechanism providing stability control augmentation. The system may comprise any and all of the features described herein with reference to any aspect of the invention.

BRIEF DESCRIPTION OF FIGURES

Preferred embodiments of the invention are described below by way of example only and with reference to the accompanying figures in which.

DETAILED DESCRIPTION

Figure 1:
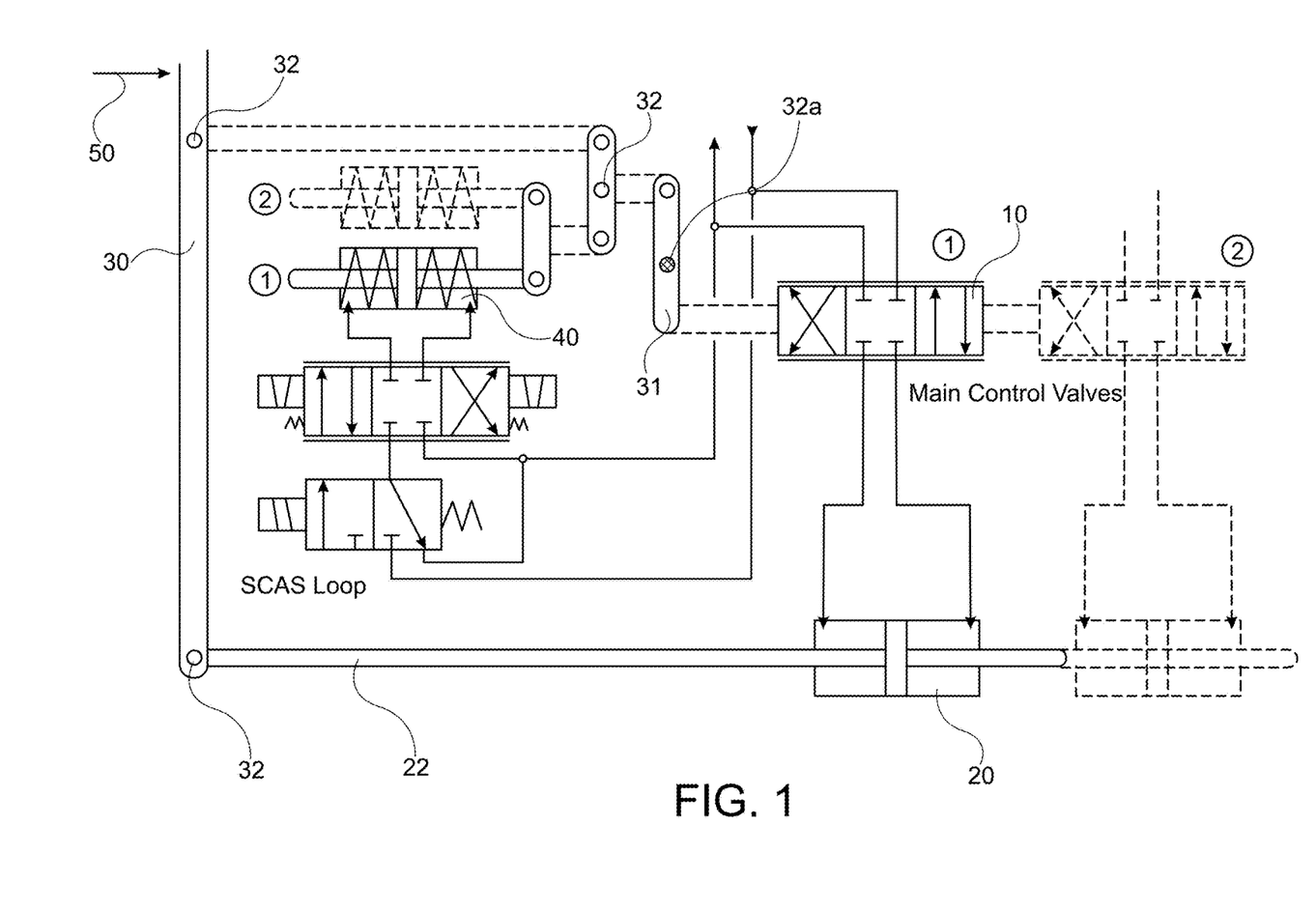
FIG. 1 shows a Stability Control Augmentation System (SCAS)

FIG. 1 shows a dual redundant Stability Control Augmentation System (SCAS) comprising a separate SCAS loop 40 for providing stability control augmentation to a flight control surface. A control valve 10 is actuable by an input linkage 30 of levers and pivots 32, 32a to control operation of an actuator 20, and the SCAS loop 40 is operable to modulate (e.g. fractionally adjust) input from the input linkage 30 to fine-tune operation of the control valve 10 and hence of the actuator 20. The actuator 20 is coupled to the input linkage 30 by a feedback mechanism 22 to provide feedback to the control valve 10 via the input linkage 30. A dual-arrangement of valves 10 is provided to drive the actuator 20 for the sake of redundancy.

Input (e.g. pilot input) to the input linkage 30 is shown schematically by arrow 50. All of the pivots 32 of the input linkage 30 except pivot 32a are floating pivots (e.g. not fixed in space), so actuation of the control valve 10 depends upon co-operation of the input linkage 30, the SCAS loop 40 and the feedback mechanism 22. For example, the input shown by arrow 50 rotates the first link clockwise about the pivot 32 at the end of the feedback mechanism 22, which in turn drives the link 31 clockwise about the fixed pivot 32a (e.g. not moveable in space) to thereby actuate an element of the control valve 10 in a leftward direction, subject to any adjustment of the link 31 by the SCAS loop 40. The SCAS loop 40 therefore operates in addition to input into the input linkage 30, to provide e.g. adjustment of control valve 10 to counteract vibrations in the actuator 20 or a downstream flight control surface.

Figure 2A:
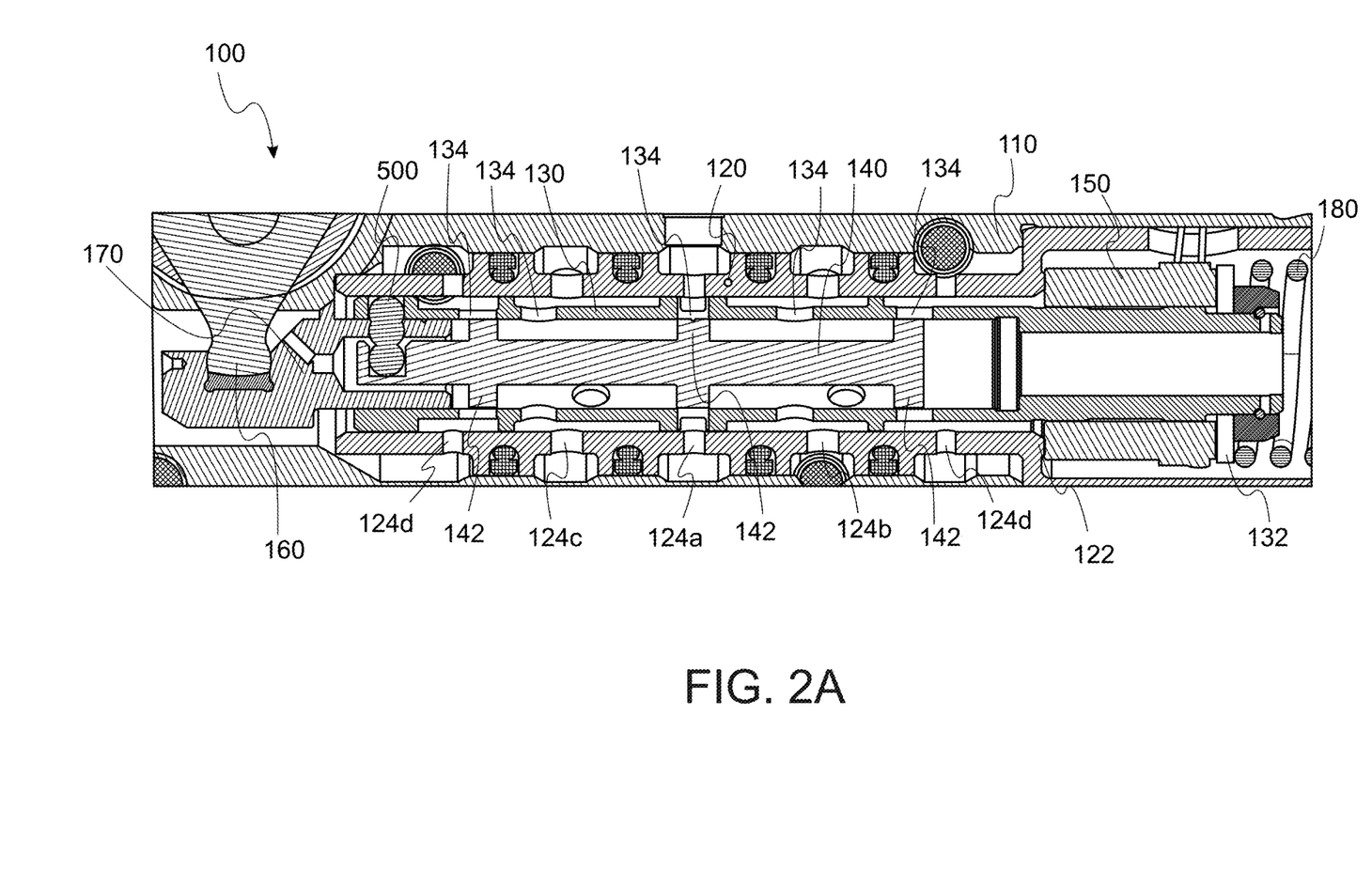
FIG. 2A shows a cross-section of a control valve for a SCAS, comprising an integrated augmentation mechanism.

FIG. 2A shows a cross-section through a control valve 100 for a dual redundant Stability Control Augmentation System (S CAS), comprising an integrated augmentation mechanism. The control valve 100 is arranged to control (e.g. permit or prevent as needed) a flow of hydraulic fluid to opposed chambers 210, 220 of a hydraulic actuator 200 (see FIGS. 4A and 4B) to thereby control operation of the hydraulic actuator 200. It does this by opening and closing fluid flow paths therein. The hydraulic actuator 200 is arranged to actuate a flight control surface of an aircraft (not shown).

The control valve 100 comprises a housing 110 within which is provided a fixed sleeve 120 which is fixed relative to the housing 110 (and is stationary throughout use), an intermediate sleeve 130 within the fixed sleeve 120 and a spool 140 within the intermediate sleeve 130. The fixed sleeve 120, the intermediate sleeve 130, and the spool 140 are coaxial with one another. The spool 140 is fully within the intermediate sleeve 130, and the intermediate sleeve 130 is therefore disposed about the spool 140.

A piezoelectric element 150 is disposed about an end of the intermediate sleeve 130 and is operable to move the intermediate sleeve 130 relative to the fixed sleeve 120 (and relative to the housing 110). The piezoelectric element 150 depicted in the figures is a cylindrical element, but may take any suitable shape as needed to drive the intermediate sleeve 130. The piezoelectric element 150 and intermediate sleeve 130 form part of the integrated augmentation mechanism.

The piezoelectric element 150 is disposed between a shoulder 122 of the fixed sleeve 120 and a flange 132 of the intermediate sleeve 130. The axial length of the piezoelectric element 150 is adjustable based on a voltage applied thereto (e.g. by a controller), and hence is operable to move the intermediate sleeve 130 axially in a first direction (left in the orientation of FIG. 2A) by contracting and in a second direction (right in the orientation of FIG. 2A) by expanding. A spring 180 is disposed on the opposite side of the flange 132 to the piezoelectric element 150 and urges the intermediate sleeve 130 in the first direction.

The fixed sleeve 120 comprises a plurality of fluid ports 124a-d for flow of hydraulic fluid through the control valve 100. The intermediate sleeve 130 also comprises a plurality of sleeve ports 134 in fluid communication with the fluid ports 124a-d of the fixed sleeve 120. The spool 140 is axially moveable to place different ones of the fluid ports 124a-d into communication with each other via the sleeve ports 134 of the intermediate sleeve 130. Thus, movement of the spool 140 in first and second directions can control fluid flow to different one of the ports 124a-d of the fixed sleeve 120, and thereby control fluid flow to the actuator 200.

Figure 2B:
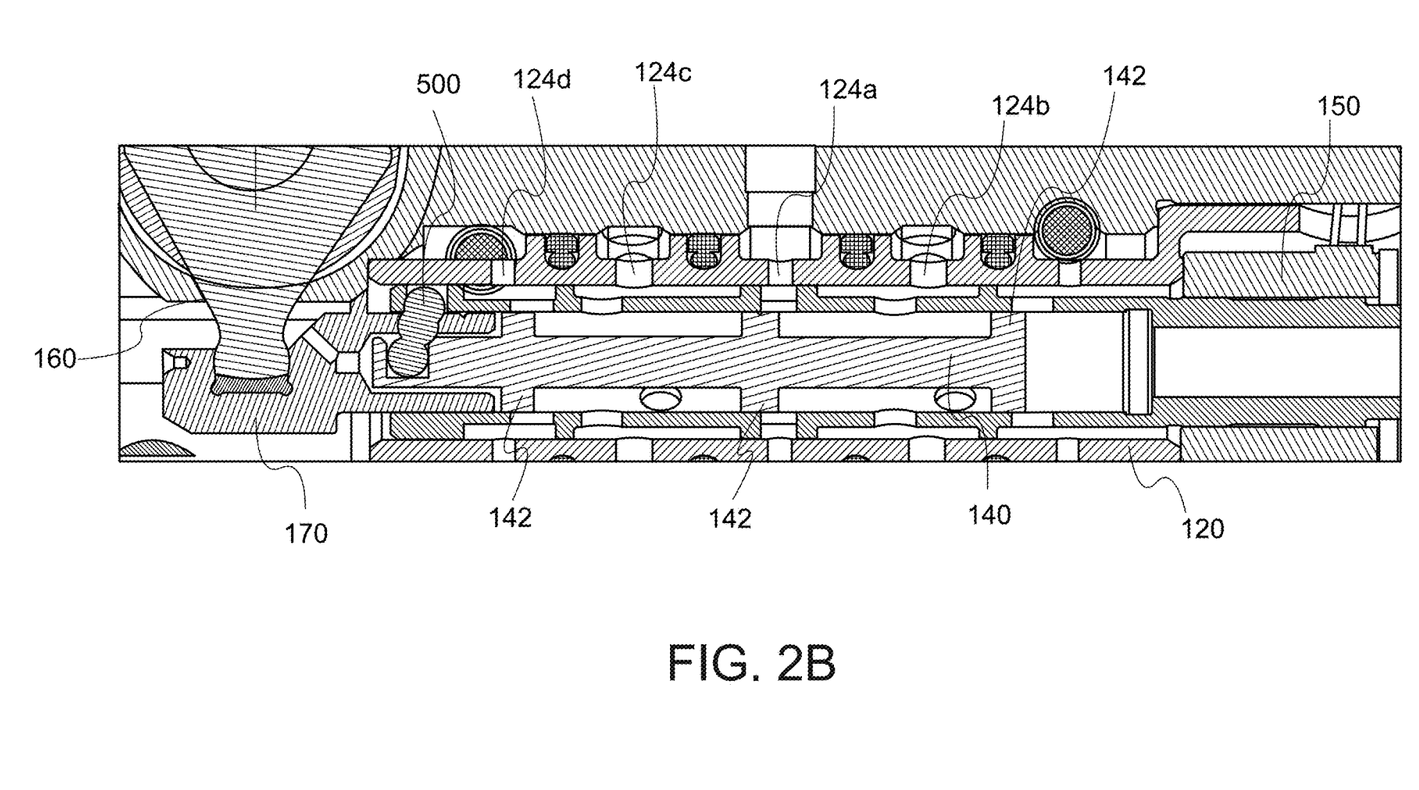
FIG. 2B shows a cross-section of the control valve of FIG. 2A in another configuration.

FIG. 2B shows the control valve 100 of FIG. 2A with the spool 140 moved axially in the first direction (left in the orientation of the figure). A lever head 160 is connected to a summation sleeve 170 and is operable by an input linkage 300 (e.g. by a pilot—see FIG. 3) to actuate the summation sleeve 170 in the first and second directions (i.e. left and right in the orientation of FIGS. 2A and 2B). A rocking pin 500 connects the intermediate sleeve 130, the summation sleeve 170, and the spool 140, with the summation sleeve 170 partially disposed between the spool 140 and the intermediate sleeve 130. One end of the summation sleeve 170 comprises a recess for receiving a portion of the lever head 160, so that the end of the lever head 160 and summation sleeve 170 are mated.

The intermediate sleeve 130 is stationary relative to the fixed sleeve 120 unless actuated by the piezoelectric element 150. While the piezoelectric element 150 is in its steady-state, normal operating condition (e.g. neither expanded or contracted) then movement of the lever head 160 in the first direction (e.g. left) will move the summation sleeve 170 in a corresponding direction, and thereby cause rotation of the rocking pin 500 in the clockwise direction about a first, top pivot 510 level with the intermediate sleeve 130 (see e.g. FIG. 3B) thereby moving the spool 140 in the first direction (e.g. left), as shown in FIG. 2B. Similarly, movement of the lever head 160 in the second direction (e.g. right) will move the summation sleeve 170 in the second direction and thereby cause rotation of the pin 500 anticlockwise about the top pivot 510, thereby moving the spool 140 in the second direction (e.g. right). Thus, movement of the lever head 160 drives the spool 140 axially by leveraging the rocking pin 500 against the intermediate sleeve 130 using the summation sleeve 170.

The spool 140 comprises stops 142 which register with sleeve ports 134 of the intermediate sleeve 130 to prevent fluid flow through it, and hence to prevent fluid flow through the control valve 100. All fluid flow through the control valve 100 passes through at least one sleeve port 134 of the intermediate sleeve 130. The movement of the spool 140 therefore moves the stops 142 relative to the sleeve ports 134 and hence controls fluid communication between the fluid ports 124a-d of the fixed sleeve 120, and thereby controls the output (e.g. the supply of hydraulic fluid) from the control valve 100. As can be seen in FIG. 2B, movement of the spool 140 in the first direction (left) enables fluid communication between a supply port 124a and a first control port 124b, while simultaneously enabling fluid communication between a second control port 124c and a return port 124d. The control valve 100 will therefore actuate the actuator 200 by pressurising one of the opposed chambers 210, 220 (see e.g. FIG. 4A).

Movement of the spool 140 in the second direction by movement of the lever head 160 and rotation of the rocking pin 500 anticlockwise about the first pivot 510 will place the supply port 124a in fluid communication with the second control port 124c to move the actuator 200 in the opposite direction by pressuring the other of the opposed chambers 210, 220. At the same time, the first control port 124b will be put in fluid communication with another return port 124d.

Figures 3A, 3B, 3C:
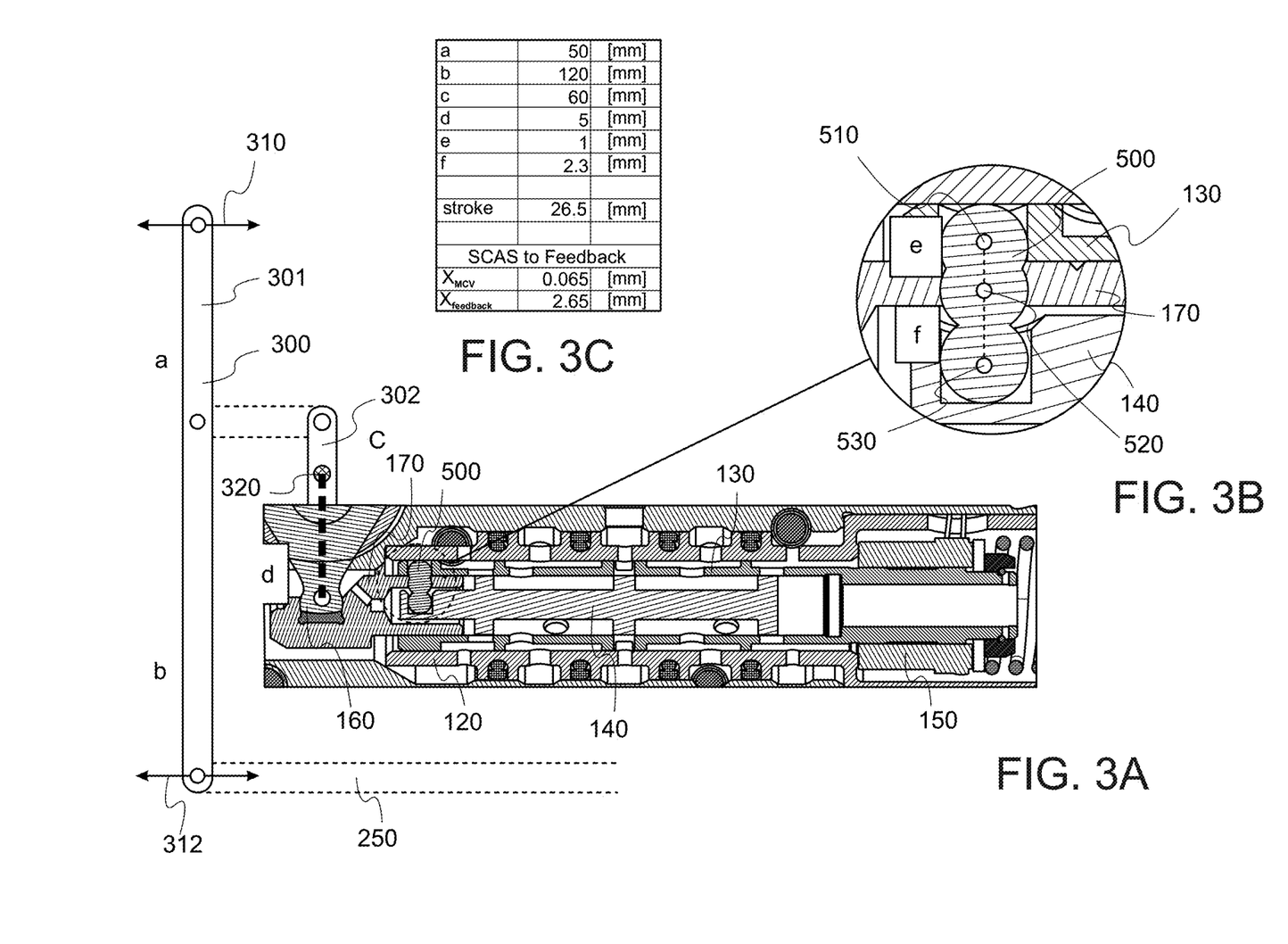
FIG. 3A shows a schematic SCAS incorporating the control valve of FIGS. 2A and 2B.
FIG. 3B shows a magnification of a portion of FIG. 3A, specifically an enlargement of a rocking pin.
FIG. 3C shows a table of exemplary dimensions for the system.

FIG. 3A shows the control valve 100 together with an input linkage 300 for controlling movement of the spool 140 within the control valve 100 via the rocking pin 500. The input linkage 300 operates similarly to that shown in FIG. 1. A first link 301 of the input linkage receives input 310 from a pilot (or flight control computer or the like), which then moves the lever head 160 and in turn moves the spool 140 via the rocking pin 500 as described above, in order to control the actuator 200. A feedback mechanism 250 provides feedback 312 to the input linkage 300 based on the configuration of the actuator 200 (see e.g. FIGS. 4A and 4B), which then returns the spool 140 to its steady-state positon to prevent further movement of the actuator 200. Only pivot 320 of the input linkage 300 is fixed (e.g. not moveable in space), with the other pivots of the input linkage 300 being able to move in space as needed (e.g. floating pivots).

FIG. 3B shows a magnification of the rocking pin 500, comprising a first pivot 510 and a second pivot 520. Depending on the operation of the intermediate sleeve 130 and summation sleeve 170, the rocking pin 500 will rotate about either or both of the first pivot 510 and second pivot 520. The first pivot 510 and second pivot 520 are located at different positions within the rocking pin 500. Rotation of the rocking pin 500 about the first pivot 510 causes the second pivot 520 to move in an arc. Rotation of the rocking pin 500 about the second pivot 520 causes the first pivot 510 to move in an arc. FIG. 3C shows exemplary dimensions for the components as labelled. Any suitable dimensions may be used.

Figure 4A:
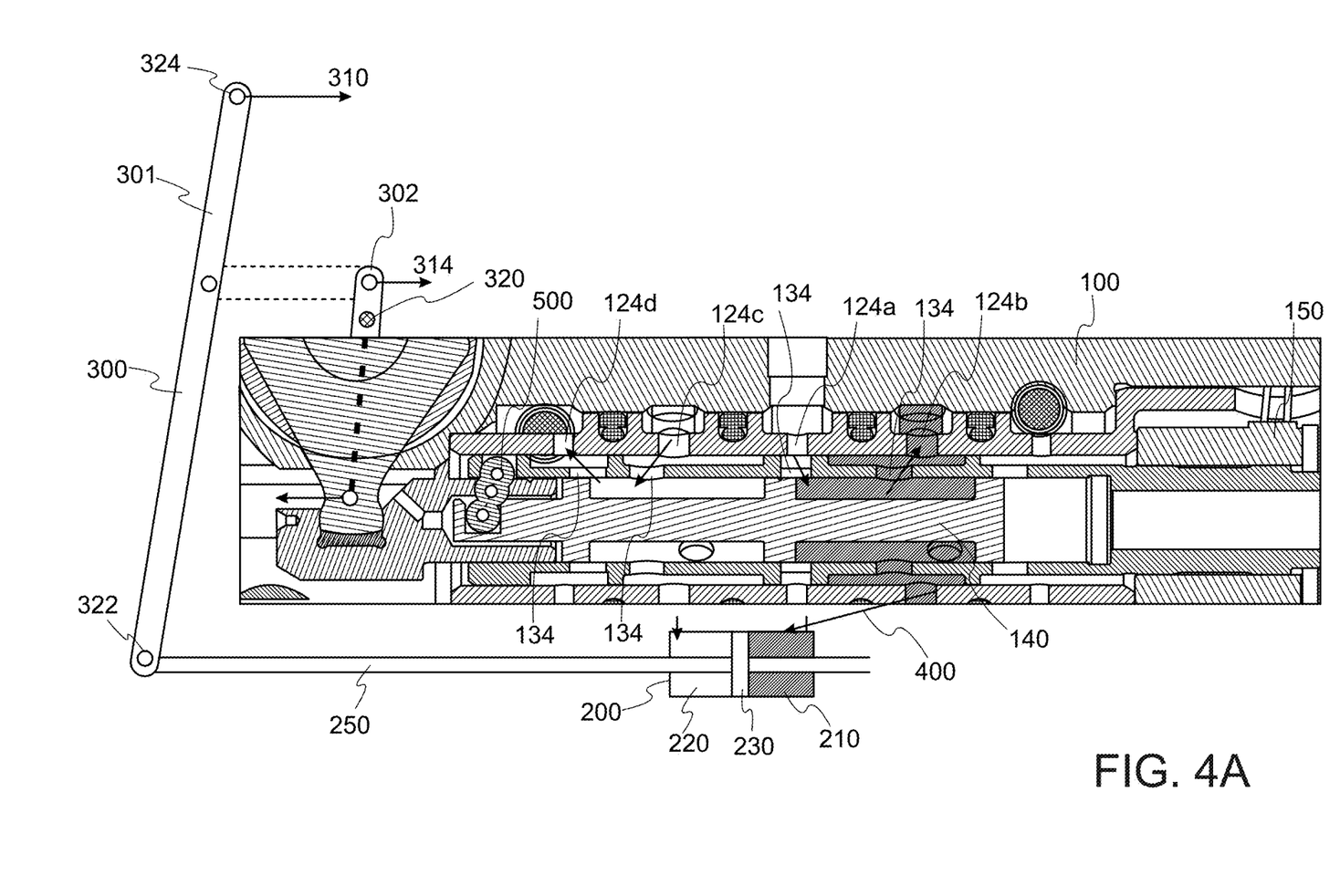
FIG. 4A shows schematically operation of a feedback mechanism.

FIG. 4A shows the control valve 100 in the same configuration as shown in FIG. 2B, together with other components of the SCAS. The input 310 to the input linkage 300 rotates the first link 301 clockwise about floating pivot 322, and therefore rotates link 302 clockwise about the fixed pivot 320 as shown by arrow 314, which in turn moves the lever head 160 and spool 140 in the first direction (left). Pressurised hydraulic fluid from the supply port 124a is therefore supplied via sleeve ports 134 in the intermediate sleeve 130 to the first control port 124b (indicated by the arrows), which supplies the fluid via a flow path 400 to the first chamber 210 of the actuator 200. At the same time, other sleeve ports 134 of the intermediate sleeve 130 permit fluid communication between the second control port 124c and the return port 124d (shown by the arrows), allowing fluid flow out of chamber 220. A pressure differential between the first chamber 210 and the second chamber 220 across a piston 230 therefore moves the actuator 200 in a first actuator direction (e.g. to the left in the orientation of FIG. 4A).

Figure 4B:
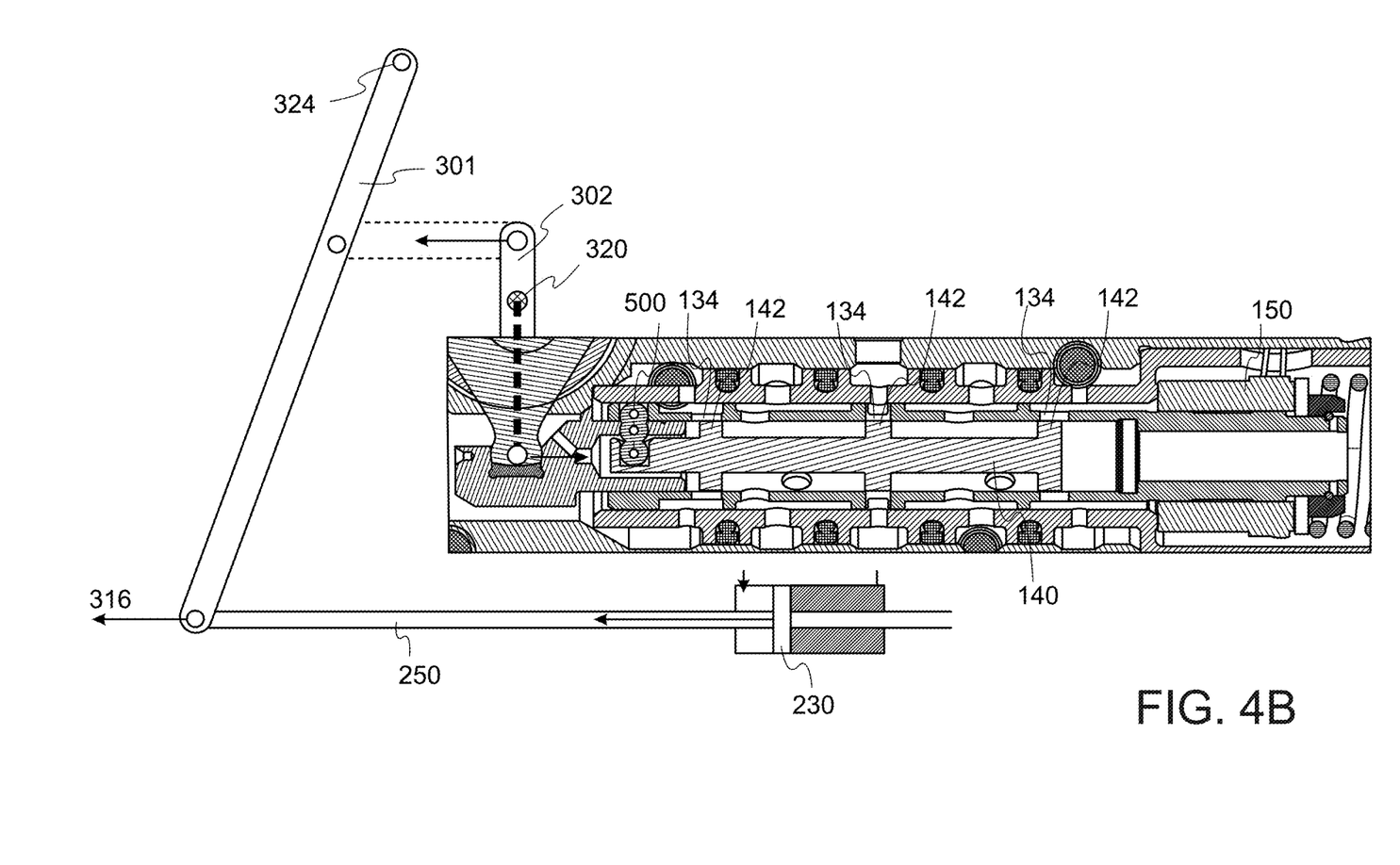
FIG. 4B shows schematically operation of the feedback mechanism of FIG. 4A.

FIG. 4B shows the system of FIG. 4A and the feedback mechanism 250 (e.g. a coupling between the actuator 200 and the input linkage 300) after the piston 230 of the actuator 200 had moved. Movement of the of the piston 230 in the first actuator direction causes rotation of the first link 301 clockwise about floating pivot 324 via the feedback mechanism 250, as shown by arrow 316. The first link 310 therefore rotates the link 302 anticlockwise about the fixed pivot 320, and hence the lever head 160 is moved so as to drive the spool 140 to close the fluid ports 124a-d and return the spool 140 to its steady-state positon so that the actuator 200 stops moving. Specifically, the second link 302 and the lever head 160 are returned to a vertical arrangement and the stops 142 of the spool 140 close the sleeve ports 134 of the intermediate sleeve 130 and thereby prevent fluid flow through the control valve 100. The actuator 200 may be actuated in the opposite direction by moving the spool 140 is the opposite direction to that shown in FIG. 4A.

The spool 140 is therefore operable to increase and/or decrease the cross-sections of fluid flow paths through the control valve 100. The more the spool 140 moves, the greater the increase or decrease. However, since the flow paths through the control valve 100 include the sleeve ports 134, the intermediate sleeve 130 may be operated to also adjust the cross-sections of the flow paths.

Figure 5A:
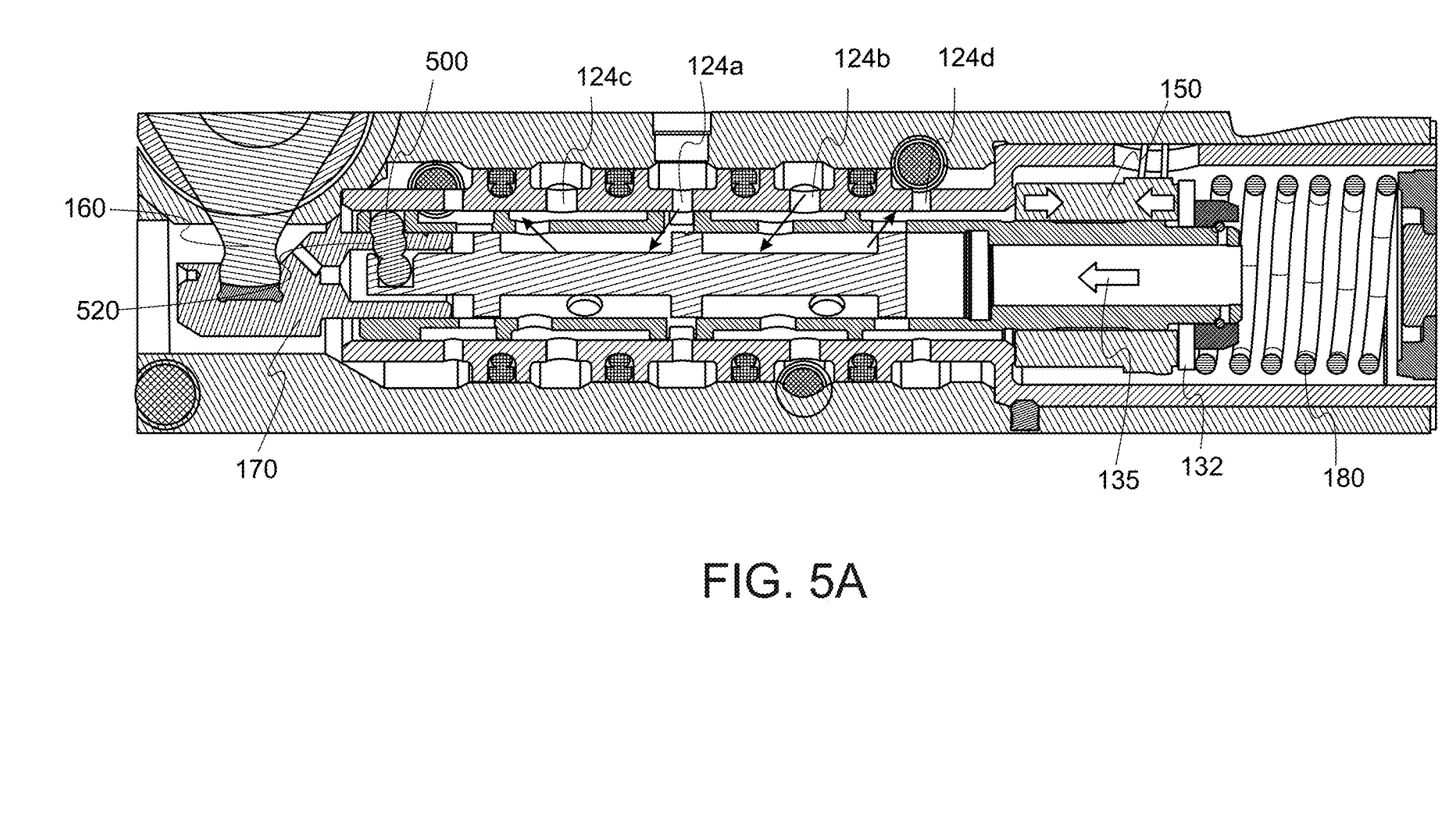
FIG. 5A shows a configuration of the control valve during operation of the integrated augmentation mechanism.
Figure 5B:
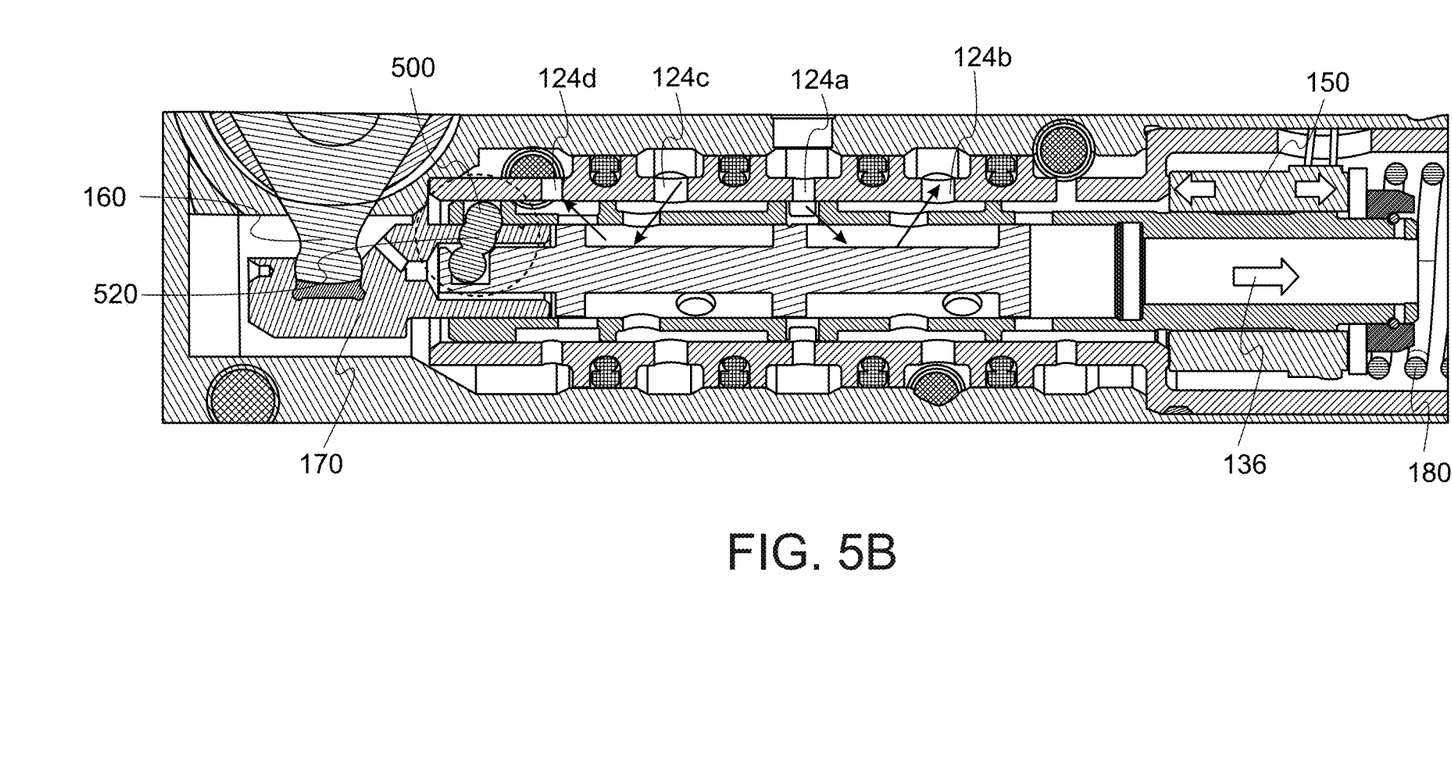
FIG. 5B shows another configuration of the control valve during operation of the integrated augmentation mechanism.

FIGS. 5A and 5B show the operation of the augmentation mechanism to increase and/or decrease the cross-sections of the fluid flow paths through the control valve 100, using the piezoelectric element 150. To augment (e.g. change by a fraction) the output of the control valve 100, the piezoelectric element 150 is contracted or extended by changing the voltage applied to it as needed e.g. using a controller. FIG. 5A shows the configuration of the control valve 100 as the piezoelectric element 150 is contracted from its steady-state configuration. As the piezoelectric element 150 contracts (e.g. by the voltage applied thereto being lowered) its axial length decreases and the intermediate sleeve 130 is moved (e.g. by spring 180) in the first direction (leftwards in the orientation of the figure) as indicated by the arrow 135.

The summation sleeve 170 serves as a fulcrum for the rocking pin 500, so that movement of the intermediate sleeve 130 in the first direction rotates the rocking pin 500 anticlockwise about the second pivot 520 (level with the summation sleeve 170), which in turn drives the spool 140 in the second direction. Thus, contraction of the piezoelectric element 150 moves sleeve ports 134 out of alignment with the stops 142 of the spool 140, and thereby enables fluid communication between predetermined ones of the fluid ports 124a-d. Specifically, the supply port 124a is put into fluid communication with the second control port 124c, and the first control port 124b is put into fluid communication with one of the return ports 124d. The actuator 200 is therefore moved accordingly.

FIG. 5B shows the configuration of the control valve 100 when the piezoelectric element 150 is expanded. In this case, the intermediate sleeve 130 is moved axially in the second direction as indicated by the arrow 136. The summation sleeve 170 again serves as a fulcrum about which the rocking pin 500 rotates clockwise about the second pivot 520 to thereby drive the stops 142 and the sleeve ports 134 out of alignment and hence permit fluid communication between predetermined fluid ports 124a-d of the fixed sleeve 120. Specifically, the supply port 124a is put into fluid communication with the first control port 124b, and the second control port 124c is put into fluid communication one of the return ports 124d. The actuator 200 is therefore moved accordingly.

The augmentation mechanism is therefore operable to drive the spool 140 in an opposite direction to the intermediate sleeve 130, and thereby control the degree of opening (and/or closing) of the fluid ports 134 in the intermediate sleeve 130, and thereby control the rate of the fluid flow through the control valve 100 during use by adjusting the cross-sections of the fluid flow paths through the control valve 100. The rocking pin 500 is therefore arranged to rotate about the two different pivots 510 and 520. Each pivot 510, 520 is also operable to move (e.g. in an arc) when the rocking pin 500 rotates about the other pivot 520, 510. The augmentation mechanism (e.g. the piezoelectric element 150 and the intermediate sleeve 130) is operable to rotate the rocking pin 500 about its second pivot 520, whereas the input linkage 300 is operable to rotate the rocking pin about its first pivot 510. The intermediate sleeve 130 provides a first fulcrum for the pin 500 to rotate about the first pivot 510, and the summation sleeve 170 provides a second fulcrum for the pin 500 to rotate about the second pivot 520. The rocking pin 500 therefore enables integration of the augmentation mechanism into the control valve 100.

Although the figures show rotation of the rocking pin 500 about its first pivot 510 separately to rotation about its second pivot 520, the piezoelectric element 150 may drive the intermediate sleeve 130 while the lever head 160 drives the spool 140. That is, the augmentation mechanism may operate in addition to the movement of the spool 140 by input to the input linkage 300. The augmentation mechanism may therefore provide stability control augmentation in addition to e.g. pilot control of the actuator 200. The intermediate sleeve 130 may be driven in either direction as needed, e.g. to increase or to decrease the cross-sections of the fluid flow paths and thereby increase or decrease the fluid flow rate through the control valve, whatever the position of the spool 140 and the flow rate provided thereby.

In use, the intermediate sleeve 130 may have a smaller stroke or travel than the spool 140 does, and therefore may have less control over the output of the control valve 100 than the spool 140 does. Thus, the augmentation mechanism comprising the intermediate sleeve 130 and the piezoelectric element 150 may be operable to act in addition to the spool 140 to fractionally modify the output of (e.g. the rate of flow of hydraulic fluid through) the control valve 100.

The system may include a sensor arranged to detect movement, vibration and/or fluctuation of the flight control surface, and a controller which may receive signals from the sensor to control operation of the piezoelectric element 150 in order to thereby counteract the sensed vibration and/or fluctuation of the flight control surface. The operation of the integrated augmentation mechanism may be at a higher frequency than operation of the spool 140 by the input linkage 300.

As described herein, the present invention integrates stabilisation control augmentation into the control valve 100, and does so using the rocking pin 500 driven by the piezoelectric element 150 to adjust the output of the control valve 100 in addition to pilot commands via the input linkage. Integration of the augmentation mechanism reduces the weight and complexity of the SCAS.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A stability control augmentation system for a flight control surface of an aircraft, comprising:
   an actuator operable for actuating the flight control surface; and
   a control valve comprising a spool and an integrated augmentation mechanism, wherein the spool is moveable to increase or decrease a cross-section of a fluid flow path through the control valve to thereby increase or decrease a flow of hydraulic fluid to the actuator during use, and wherein the integrated augmentation mechanism is operable to increase or decrease the cross-section of the fluid flow path to thereby adjust the flow of hydraulic fluid to the actuator;
   wherein the control valve comprises a rocking pin connecting the spool and the augmentation mechanism, wherein the rocking pin is rotatable about two different points.

2. The stability control augmentation system as claimed in claim 1, wherein the spool has a steady-state position in which the fluid flow path is closed, wherein the spool is axially moveable from the steady-state position in a first direction to thereby actuate the actuator in a first actuator direction, and wherein the spool is axially moveable from the steady-state position in a second direction to actuate the actuator in a second actuator direction.

3. The stability control augmentation system as claimed in claim 1, wherein the augmentation mechanism comprises an intermediate sleeve that is axially movable to increase or decrease the cross-section of the fluid flow path through the control valve.

4. The stability control augmentation system as claimed in claim 1, wherein the augmentation mechanism comprises a piezoelectric element operable to increase or decrease the cross-section of the fluid flow path.

5. The stability control augmentation system as claimed in claim 1, further, comprising:
   an input linkage operable to move the spool of the control valve.

6. The stability control augmentation system as claimed in claim 5, comprising a feedback mechanism configured to adjust the input linkage based on the configuration of the actuator.

7. The stability control augmentation system as claimed in claim 6, wherein the control valve comprises a summation sleeve movable by a lever head of the input linkage to move the spool.

8. The stability control augmentation system as claimed in claim 1, wherein the control valve comprises a housing, and the spool and the augmentation mechanism are contained within the housing.

9. The stability control augmentation system as claimed in claim 1, further comprising:
   a controller configured to operate the integrated augmentation mechanism.

10. An aircraft comprising the stability control augmentation system as claimed in claim 1, arranged to actuate a flight control surface of the aircraft.

11. A method of providing stability control augmentation to a flight control surface of an aircraft, comprising:
    providing a control valve comprising a spool and an integrated augmentation mechanism;
    increasing or decreasing a cross-section of a fluid flow path through the control valve by moving the spool to thereby increase or decrease a flow of hydraulic fluid to an actuator operable to actuate the flight control surface; and
    increasing or decreasing the cross-section of the fluid flow path using the augmentation mechanism to thereby adjust the flow of hydraulic fluid to the actuator;
    providing a rocking pin connecting the spool and the augmentation mechanism, and rotating the rocking pin about a first pivot to actuate the spool of the control valve and thereby increase or decrease the cross-section of the fluid flow path.

12. A method as claimed in claim 11, further comprising:
    actuating the augmentation mechanism and thereby rotating the rocking pin about a second pivot to increase or decrease the cross-section of the fluid flow path.

* * * * *